Figure 5:
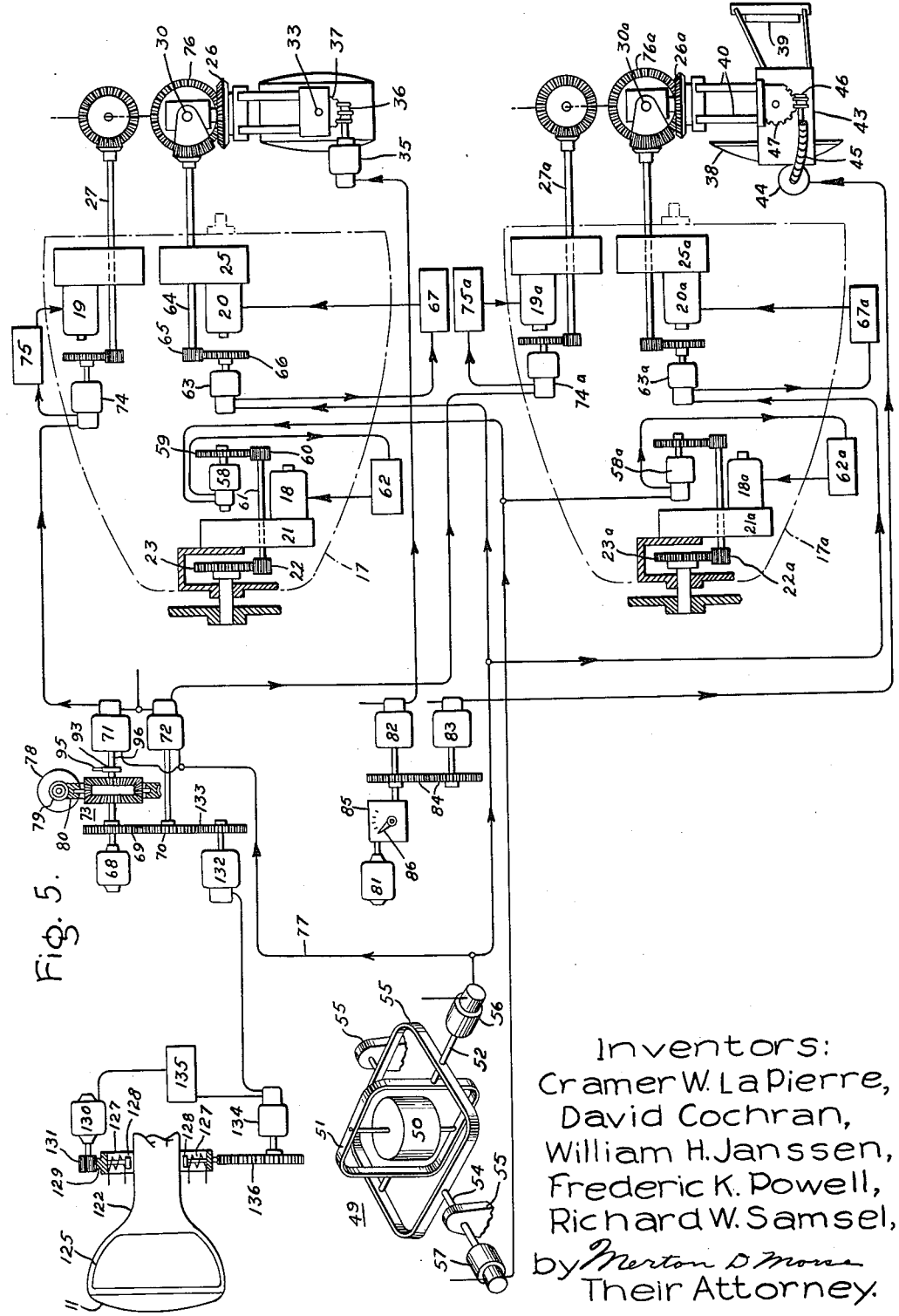

Dec. 4, 1962     C. W. LA PIERRE ET AL     3,067,281
UNDERWATER OBJECT LOCATOR AND VIEWER
Filed Oct. 1, 1945     5 Sheets-Sheet 1
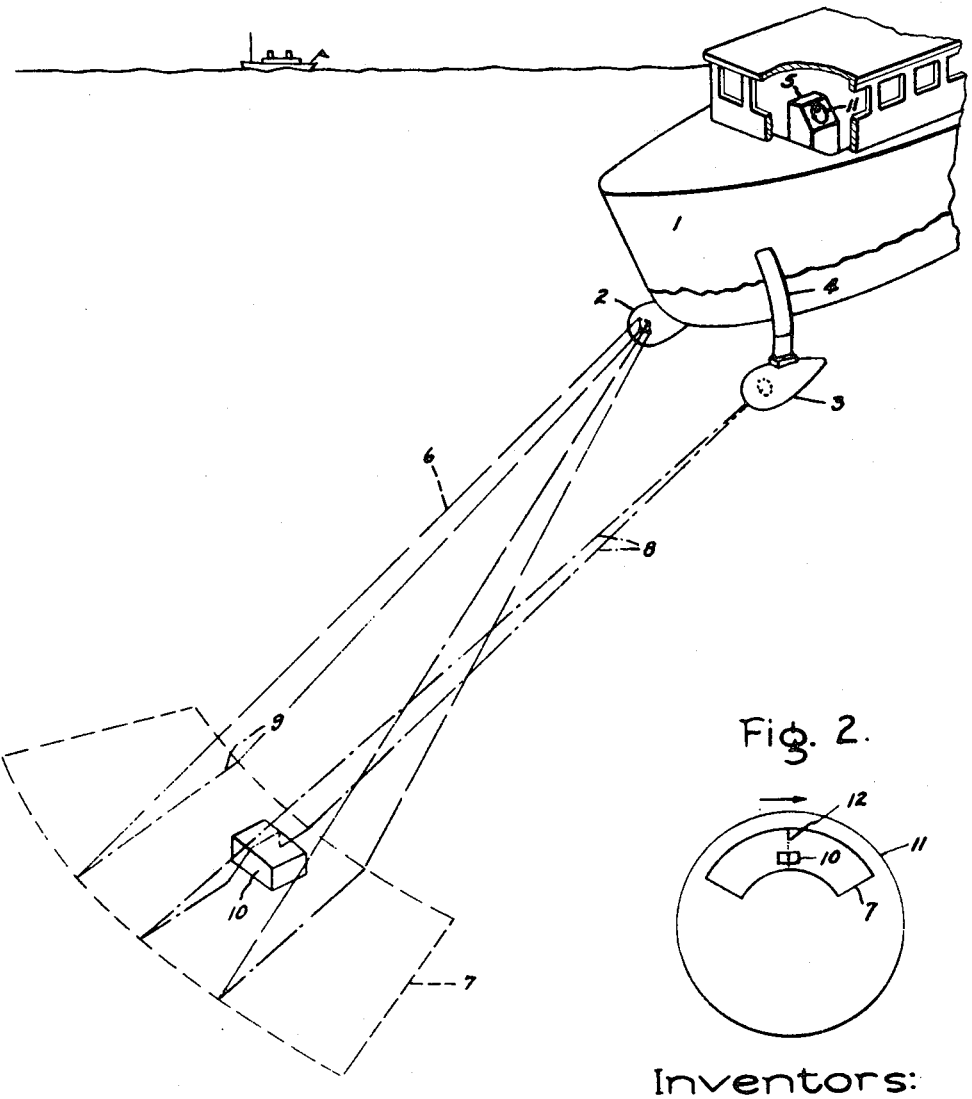
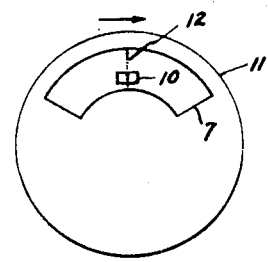
Inventors:
Cramer W. La Pierre,
David Cochran,
William H. Janssen,
Frederic K. Powell,
Richard W. Samsel,
by Merton D. Moore
Their Attorney.

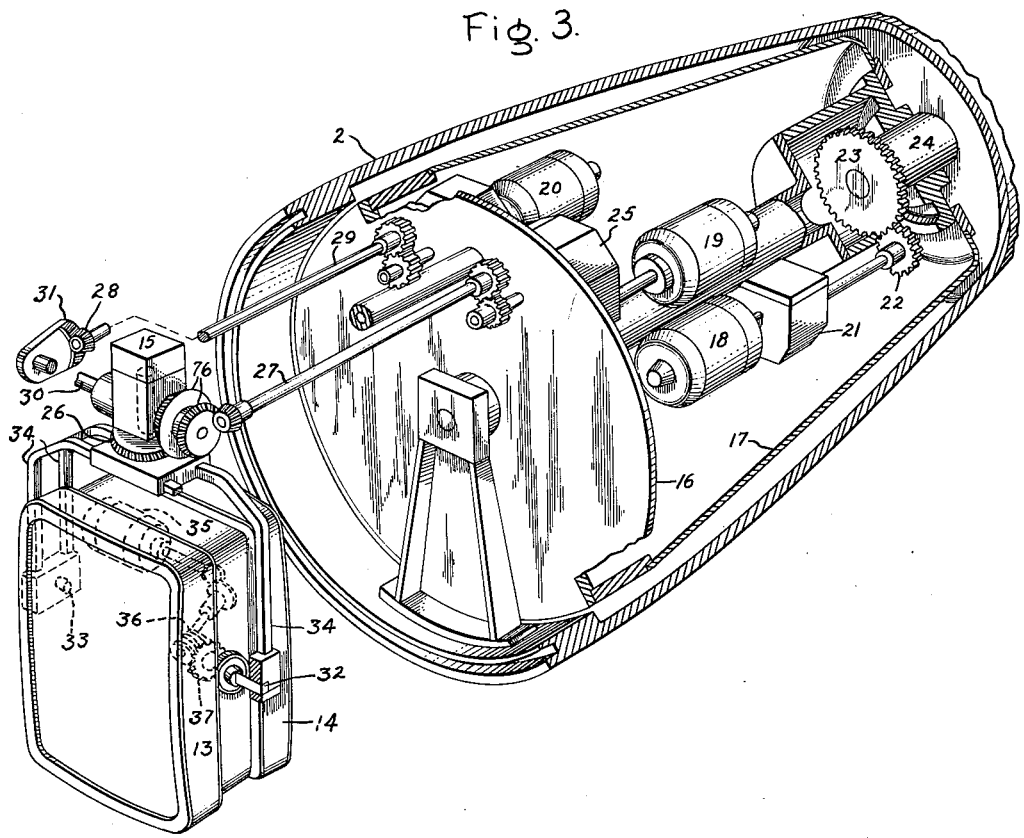
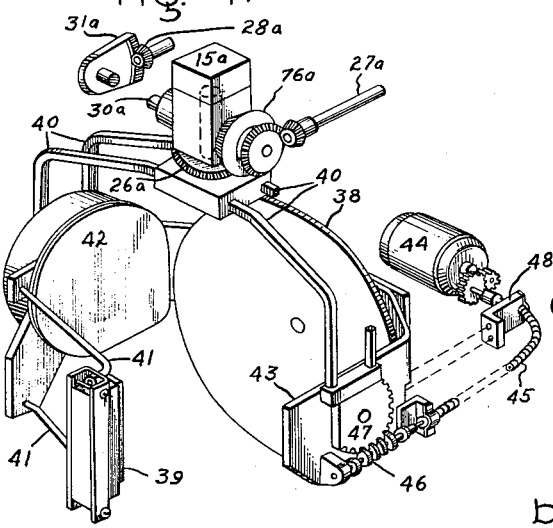

Dec. 4, 1962  C. W. LA PIERRE ET AL  3,067,281
UNDERWATER OBJECT LOCATOR AND VIEWER
Filed Oct. 1, 1945  5 Sheets-Sheet 3

Inventors:
Cramer W. La Pierre,
David Cochran,
William H. Janssen,
Frederic K. Powell,
Richard W. Samsel,
by Merton D Morse
Their Attorney.

Dec. 4, 1962 C. W. LA PIERRE ET AL 3,067,281
UNDERWATER OBJECT LOCATOR AND VIEWER
Filed Oct. 1, 1945 5 Sheets-Sheet 4

Inventors:
Cramer W. LaPierre,
David Cochran,
William H. Janssen,
Frederick Powell,
Richard W. Samsel, by Merton D Mone
Their Attorney.

Dec. 4, 1962   C. W. LA PIERRE ET AL   3,067,281
UNDERWATER OBJECT LOCATOR AND VIEWER
Filed Oct. 1, 1945   5 Sheets-Sheet 5
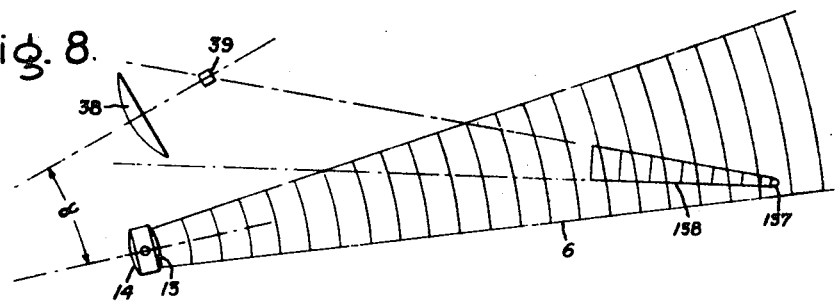
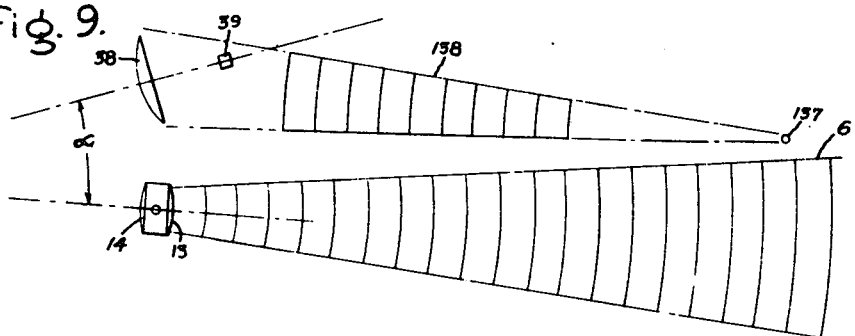
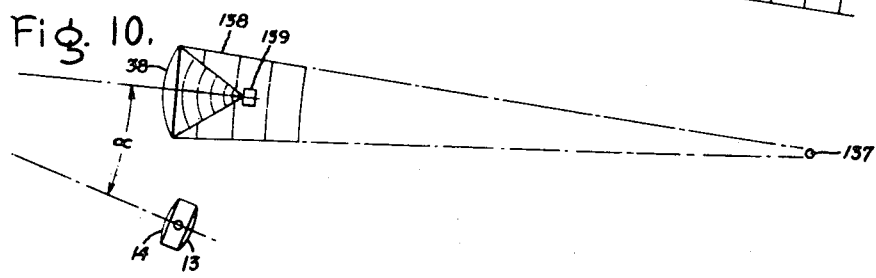
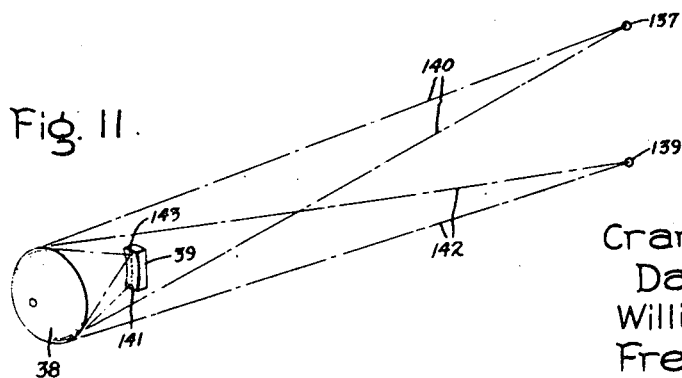
Inventors:
Cramer W. La Pierre,
David Cochran,
William H. Janssen,
Frederic K. Powell,
Richard W. Samsel,
by Milton D. Moon
Their Attorney.

United States Patent Office

3,067,281
Patented Dec. 4, 1962

3,067,281
UNDERWATER OBJECT LOCATOR AND VIEWER
Cramer W. La Pierre, David Cochran, William H. Janssen, Frederic K. Powell and Richard W. Samsel, Schenectady, N.Y., assignors to General Electric Company, a corporation of New York
Filed Oct. 1, 1945, Ser. No. 619,720
19 Claims. (Cl. 178—6.8)

This invention relates to an apparatus for locating objects under water and for determining their approximate size and shape.

The navigation of vessels in harbors, particularly in strange waters, is sometimes extremely difficult because of submerged obstructions. Sound energy has been employed in the past to determine the range and bearing of a submerged object. However, for operations such as the clearing of harbors to remove sunken objects it is desirable to secure the additional information as to the size and shape of the objects located. In order to secure additional information concerning objects in the water it is desirable to provide an apparatus which can form a representation of the object such that it can be seen by the operator. Accordingly, it is an object of this invention to provide an apparatus for locating objects under water and for presenting a shadowgraph or similar image indicating the approximate size and shape of the objects.

It is another object of this invention to provide an apparatus employing supersonic wave energy for obtaining sufficient information by reflection of transmitted signals to make possible the forming of a composite picture representing the approximate size and shape of objects under water.

It is another object of this invention to provide an apparatus for determining the relative positions and relative sizes of a plurality of objects in a selected region under water.

It is another object of this invention to provide an apparatus employing supersonic signals for determining the approximate size and shape of objects under water and which may be mounted aboard a vessel and stabilized against rolling and pitching to present a satisfactory image regardless of the other normal movements of the vessel.

It is another object of this invention to provide apparatus employing supersonic wave energy under water and including an improved arrangement for receiving a plurality of signals from individual portions of the volume of water under examination.

Figure 6:
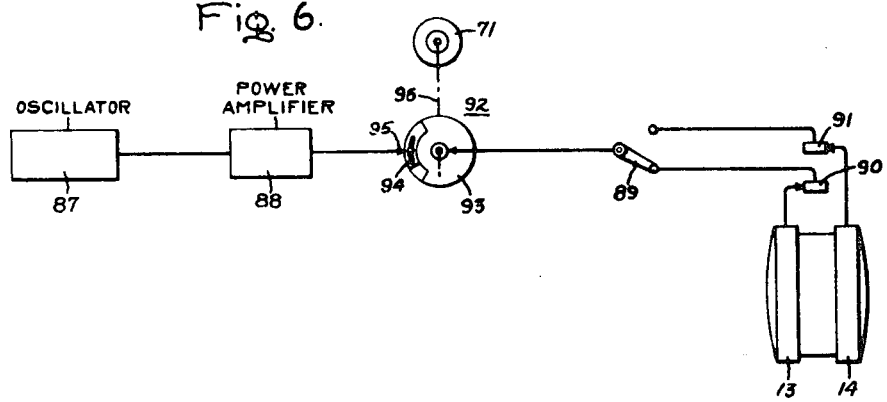
Figure 7:
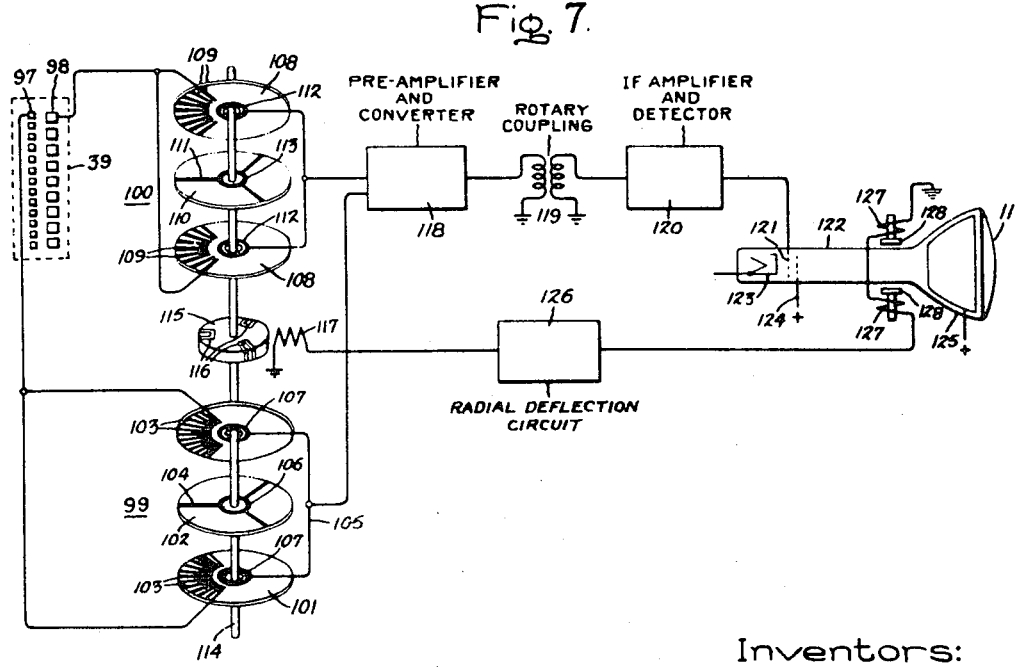

The novel features which are belived to be characteristic of this invention are set forth with particularity in the appended claims. The invention itself, however, both as to its organization and method of operation, together with further objects and advantages thereof, may best be understood by reference to the following description taken in connection with the accompanying drawings in which FIG. 1 represents diagrammatically a vessel provided with an apparatus embodying the invention shown in operation; FIG. 2 is a view of the luminescent screen of the cathode ray device employed in the apparatus of FIG. 1; FIG. 3 is a diagrammatic view of the working parts of the transmitting mechanism of the system of FIG. 1; FIG. 4 is a diagrammatic view of the receiving transducer assembly of the apparatus; FIG. 5 is a diagrammatic representation of the stabilizing devices and control circuits of the apparatus; FIG. 6 is a diagrammatic illustration of the electrical circuits of the transmitting transducer; FIG. 7 is a diagrammatic representation of the electrical circuits of the receiving equipment; FIGS. 8, 9 and 10 are diagrammatic illustrations representing three different positions of the transmitter and receiver during operation; and FIG. 11 is a diagrammatic representation of the receiving transducer in operation.

Briefly, the object locating apparatus illustrated in the accompanying drawings comprises stabilized supersonic wave energy transmitting and receiving devices mounted in streamlined housings arranged to be suspended in spaced relation from a vessel and under water. The transmitting apparatus is arranged to project a relatively wide beam of high intensity supersonic wave energy so that echoes are reflected from any objects in the path of the beam. Receiving apparatus is arranged to pick up the echoes from such objects, small portions of the volume of water under examination being viewed by the receiving apparatus in succession in such a manner that a great number of signals from the different portions of the volume under examination are received and transmitted to a signal translating device including an instrument, such as a cathode ray tube, having a luminescent screen on which is presented a picture or image of the field or volume of water under examination. Any objects in the field are represented in their approximate shape on the screen and their approximate size can be determined by a calibration of the scale on the screen.

Referring now to FIG. 1 a vessel 1 is provided with a supersonic wave energy transmitting equipment arranged in an underwater housing 2 and with a receiving equipment for receiving echoes of the transmitted wave energy and which is arranged in an underwater housing 3, the housings having suitable sound transmitting surfaces or "windows." Both housings are supported from the vessel in a suitable manner, as by an arm 4 shown for suspending the housing 3 from the vessel. The control equipment including the power supply and gyroscope for the stabilizing control are located on the vessel and also the signal translating apparatus as shown in a cabinet, indicated at 5. The transmitter and receiver in the housings 2 and 3 are stabilized and are rotated about axes which are maintained vertical regardless of the rolling and pitching of the vessel 1. The transmitter projects a beam of high intensity supersonic energy represented by the dashed line 6 passing through the housing 2, and rotation of the transmitter about its vertical axis causes the beam to traverse a volume of water having as its base an area indicated by the dotted line 7 which represents an area of the ocean bottom and which is defined by two concentric arcs and two radii the positions of which are determined by the portion of each revolution of the transmitter during which the beam is projected. It will thus be evident that a substantial area is "illuminated" by the supersonic beam 6 and further that that this "illuminated" area is swept over the area of the bottom under investigation. The receiver is arranged to pick up echoes of the sound waves from objects within the area or volume under examination. These echoes reach the receiver at a predetermined time after the beam 6 has impinged on the object and for this reason it will be obvious that FIG. 1 does not purport to show the exact relations of the beam and the echo with respect to time. As a matter of convenience it might be considered that an echo represented by the dotted lines 8 is an echo of the beam 6 which has been shown "illuminating" the area containing object under consideration represented by a rectangular block 10. During the actual operation of the apparatus the receiver lags behind the transmitter by a predetermined angle; however, it is driven at the same speed as the transmitter. By varying the angle between the transmitter and the receiver the effective focal length of the apparatus is determined so that portions of the volume of water traversed by the beam 6 which are above the floor of the ocean may be investigated by decreasing the angle of lag of the receiver with respect to the transmitter. The receiver is constructed in a manner to be described later so that, as the field of the receiver is swept over portions of the surface of an object, there will be seen successive signals indicating the characteristics of the surface. Furthermore the receiver is so constructed that for each position it will provide a plurality of signals each representing a different angle of declination in the volume of water under investigation. The receiver is so constructed that it will receive echoes substantially only in a vertical plane.

The signal appearing on screen 11 of a cathode ray tube in the translating apparatus 5 is represented in FIG. 2 in which the area under investigation is indicated at 7, the transmitter beam being swept from left to right as indicated by the arrow at the top of the figure, and the receiver investigating a plurality of points along a radial line as indicated at 12, the line 12 being the line of signals formed when the receiver is in the position shown in FIG. 1. The screen is of the high persistence type so that the luminescent spots produced by the signals remain sufficiently long to present the required image to the eye and the line 12 represents only one of a great number of radial lines produced during rotation of the receiver 3. It will be noted that the radial lines appearing on the screen represent lines in a plurality of vertical planes and the selected angles of declination in those lines.

In order to obtain a satisfactory image or shadowgraph of objects in the path of the beam 6, it is necessary that the transmitter in the housing 2 and the receiver in the housing 3 be stabilized so that their axes of rotation remain vertical regardless of rolling and pitching of the vessel 1. Mechanical equipment for effecting this stabilization is diagrammatically shown in FIGS. 3 and 4. In FIG. 3 a transmitting transducer assembly comprising two transducers 13 and 14 is suspended from a head 15 and mounted by a bracket or arm (not shown) on an end plate 16 of a drum 17. Within the drum 17 are arranged motors 18, 19 and 20. The motor 18 is connected through a gear box 21 and a pinion 22 to a stationary gear 23 and rotation of the motor drives the drum 17 about the stationary shaft 24 of the gear 23. By controlling the motor 18 in accordance with the rolling of the vessel the barrel 17 may be maintained in a predetermined position such that the axis of rotation of the transducer is maintained vertical. The motor 19 is connected through a reduction gearing 25 to drive a gear 26 and rotate the transducer assembly about its vertical axis, the gearing 25 being arranged to drive the gear 26 by suitable geared connections and through a shaft 27 mounted in the supporting bracket (not shown). The motor 20 drives a pinion 28 through a shaft 29 and is arranged to rock or swing the transducer assembly about the axis of a shaft 30 by rotation of a sector gear 31. The motor 20 is controlled in accordance with the pitching motion of the vessel so that the axis of rotation of the transducer is maintained vertical regardless of the pitching of the vessel. The transducers 13 and 14 may be rotated about stub shafts 32 and 33 which provide a horizontal axis. The stub shafts 32 and 33 are rigidly secured in arms 34 which suspend the transducer from the head 15. The space between the transducers 13 and 14 is enclosed and a motor 35 is connected through suitable gearing to drive a worm 36 and rotate the transducers about a gear 37 secured to the shaft 32. The transducers may thus be rotated to change their declination and determine the direction in which the beam is projected with respect to the horizontal. Only one of the transducers is used at a time, the other one being deenergized. The construction of the housing 2, together with the arrangement of the drum 17 and the roll stabilizing equipment, is described and claimed in a copending application Serial No. 619,642, now Patent No. 2,826,749, filed concurrently herewith in the name of Francis R. Ellenberger and assigned to the same assignee as the present invention. The arrangement for stabilizing the transducer to correct for the pitching of the vessel and including the pendulous support of the transducer is described and claimed in a copending application Serial No. 619,643, now Patent No. 2,832,944, filed concurrently in the name of George W. Kessler and assigned to the same assignee as the present invention. The receiving transducer shown in FIG. 4 is mounted on a stabilizing drum in the same manner as the transmitting transducer of FIG. 3 and is also stabilized in the same way and corresponding parts of the equipment in FIG. 4 have been designated by the same numerals as employed in FIG. 3 with the addition of the letter "a."

The receiver shown in FIG. 4 includes a parabolic reflector 38 and transducer 39 arranged in a line lying substantially in the focal region or zone of the reflector. The reflector 38 may be constructed of steel or other suitable material which is not completely sound reflecting; however, the thickness of the reflector is selected in terms of the wavelength of the frequencies to be employed so as to be anti-resonant and provide good reflecting properties. For example, the reflector may be made a quarter wave or a three-quarter wave reflector. By selecting a three-quarter wave reflector for a frequency of 750 kilocycles, for example, the reflector may also be employed at a frequency of 250 kilocycles since it is a quarter wave reflector at that frequency. Such reflector would transmit substantial energy at 500 kilocycles at which frequency its thickness is one-half wave length. The reflector 38 and transducer 39 are supported from the head 15a on arms 40 which are similar to the arms 34 of FIG. 3, and the transducer 39 is maintained in its position in front of the reflector 38 by supporting brackets 41 secured to a casing 42 which in turn is supported on the left-hand pair of arms 40. Both the reflector 38 and the housing 42 are secured to the bracket 43 which is mounted for pivotal movement between the pairs of arms 40. By rotating the reflector and transducer 39 about the axis of support for the bracket 43, signals may be received from selected angles of declination. In order to vary the declination of the receiver a motor 44 is connected through a flexible cable 45 to drive a worm gear 46 which engages a sector gear 47 rigidly secured to the arms 40. The motor 44 is secured to the bracket 43 on a lug 48 and moves with the bracket 43.

By employing stabilization equipment such as that indicated in FIGS. 3 and 4 the transmitting and receiving transducers can be maintained in position for rotation about stable vertical axes. In order to secure the definition necessary to indicate clearly the approximate size and shape or contour of objects it is necessary to employ high frequency supersonic energy and to rotate the apparatus so that a sufficient number of signals are obtained to provide a picture of any object in the field of view. At the speeds of operation and at the frequencies employed it has been found that reasonably satisfactory images or pictures can be obtained without the necessity of adding further corrections for linear changes in position of the vessel or for yawing of the vessel. Furthermore the changes in vertical height of the transducer and receiver during rolling, for example, can also be neglected.

The stabilizing control apparatus as indicated diagrammatically in FIG. 5 includes a gyroscope 49 mounted in a Cardan suspension in a manner well known in the art. The gyroscope includes a rotor 50 which maintains itself upright throughout operation of the apparatus. The rotor 50 is mounted in a gimbal ring 51 which is rotatable about the axis of a shaft 52 corresponding to the pitch axis of the vessel, the shaft 52 being rotated in a second gimbal ring 53 mounted on a shaft 54 corresponding to the roll axis of the vessel, the shaft 54 being mounted in bearings 55 secured to the structure of the vessel. Any movements of the rings 51 and 53 about their respective axes are transmitted to selsyns 56 and 57 which provide the pitch and roll correction signals, respectively. The correction for roll is transmitted to followup selsyns 58 and 58a in the transmitter and receiver equipments, respectively. In FIG. 5 both the transmitter and receiver stabilizing equipments have been indicated. These equipments, except for the construction of the transducer assemblies, are identical and corresponding parts of the receiver equipment have been designated by the same numerals with the addition of the letter "a." Furthermore, in the following description only the transmitter elements will be referred to except when specific reference is made to the receiver, it being understood that the corresponding parts of the transmitter and receiver are connected for operation in the same manner in response to the same signals.

Signals representing the rolling of the vessel are transmitted by the selsyn 57 to a selsyn 58 which is a followup selsyn for controlling the roll motor 18. The selsyn 58 is geared directly on a 1:1 ratio with the drum 17 through gears 59 and 60 to a shaft 61 which is the shaft driven by the motor 18 through the gearing 21. When a signal is received by the selsyn 58 it is supplied by the selsyn to a suitable amplifying equipment 62 which supplies power to motor 18 and drives the drum until the selsyn 58 is in the position required by the signals, in other words, in a position corresponding to the position of the selsyn 57 whereupon the zero signal is transmitted by the selsyn 58 to the amplifying equipment 62. The operation of this type of system is well known in the art and it will be understood that the adjustment of the position is accomplished substantially simultaneously with the movement of the roll indicating selsyn. Pitching movement of the vessel produces a signal in the selsyn 56 which is supplied to a followup selsyn 63 for controlling the pitch motor 20, the selsyn 63 being rotated by the pitch gearing to a shaft 64 and gears 65 and 66. Signals from the selsyn 63 are supplied to a servo amplifying equipment 67 which supplies power for driving the motor 20 and the operation of the motor 20 to move the transducer assembly pendulously about its axis 30. Rotation of the transducer assembly about its vertical axis, as controlled by operation of the motor 19, is controlled by a driving motor 68 which is connected through gears 69 and 70 to selsyns 71 and 72, respectively, the connection between the motors 68 and the selsyn 71 being made through a differential gearing 73 the purpose of which will be explained later. The selsyns 71 and 72 rotate at the same speed by the motor 68, the selsyn 71 supplying a signal to a followup selsyn 74 for controlling the motor 19 and the selsyn 72 supplying a signal to a follow-up selsyn 74a for controlling the receiver rotating motor 19a. The selsyns 74 and 74a supply signals to servo amplifying equipments 75 and 75a and thereby control the motors 19 and 19a so that they rotate in synchronism at a speed determined by the driving motor 68, the selsyns 74 and 74a being geared to the driving shafts 27 and 27a, respectively. When the gear 26 swings about the axis 30 it must turn because of its engagement with its driving gear 76 rotatable about the shaft 30 and having a 1:1 driving ratio. The pendulous movement thus imparts to the gear 26 a corresponding rotary movement proportional to the pitching of the vessel, and, as is explained in the aforesaid Kessler application, it is necessary to add to the rotary movement of the transducer about its vertical axis a movement which compensates for the pendulus movement of the gear 26 about the shaft 30. In order to add pitch correction to the rotation of the transducer the selsyns 71 and 72 are constructed as differential selsyns and are connected to receive signals through a line 77 from the pitch indicating selsyn 56. These signals are added to the signals supplied by the selsyns 71 and 72 to the selsyns 74 and 74a, respectively, and thereby cause the motors 19 and 19a to rotate gears 76 and 76a in accordance with the pitch correction so that the gears 26 and 26a rotate at uniform speed regardless of pitching of the vessel.

During operation of the equipment the transmitter and receiver are arranged so that the angle therebetween may be varied in order to select the range of the volume of water to be investigated. It will readily be understood that the receiver must lag behind the transmitter because of the time required for sound to travel: however, particularly at close range because of paralax due to the spacing of the transmitter and transducer it may be necessary for the receiver to lead the transducer. By adjusting the angle, objects at various ranges may be examined, the angle of lag increasing directly with the range. In order to vary the angle between the receiver and transmitter, a motor 78 is geared through a worm 79 to drive the outer ring of the differential gear 73, as indicated at 80. Rotation of this outer ring gear actuates the differential to change the angle between the shafts of the motor 68 and the selsyn 71 and thereby changes the angle between the shafts of the selsyns 71 and 72. Thus by adjusting the position of the ring 80 the apparatus may be focused to operate at various ranges.

In addition to adjusting the range it is also desirable to adjust the declination of the transmitter and receiver. The adjustment of declination is arranged to be controlled by operation of a driving motor 81 which drives two selsyns 82 and 83 at the same speed through a pair of gears 84, the connection between the motor 81 and the first gear 84 being through a gear box 85 having a pointer 86 thereon for indicating the angle of declination. The selsyn 82 positions the selsyn 35 which is geared directly to drive the transmitting transducer about its pivots 32 and 33 through the worm 36 and gear 37, the selsyn 35 having sufficient power to drive the transducer directly. For convenience in illustration, the selsyn 35 has been shown outside the transmitter housing. In similar manner the selsyn 83 drives the selsyn 44 to vary the declination of the receiver through operation of the worm 46 and gear 47.

The stabilizing and control equipment as described above is thus arranged to rotate the transmitter and receiver about vertical axes regardless of rolling and pitching of the vessel, and also makes it possible to vary the positions of the transmitter and receiver simultaneously about their axes of declination and to adjust the angle between the receiver and the transmitter in order to select the operating range.

The electrical circuit for the transmitting transducer is indicated in FIG. 6 and comprises a high frequency oscillator 87 and an amplifier 88 which supply high frequency electric energy to either of the transducers 13 and 14 as determined by the position of a switch 89. Slip rings or rotatable couplings for connecting the transducers to the power supply are indicated at 90 and 91. As was mentioned above, the beam 6 shown in FIG. 1 is projected during only a portion of each revolution of the transmitting transducer. The angular portion of each revolution during which the transducer is excited may be determined, for example, by a keying mechanism 92 comprising a rotating disk 93 having a contact segment 94 thereon which may be adjusted to determine the portion of the revolution of the disk 93 during which contact is made beween a brush 95 and the segment 94. The disk 93 is rotated by a shaft 96 which is the shaft connecting the differential 73 and the selsyn 71 thereby synchronizing the keying of the excitation of the transmitter transducer with the transmitter rotation. The angular position of the segment 94 may also be changed with respect to the shaft 96 in order to select the angular position of the beam 6. For example, when the transducer 1 is in a position for projecting the beam within the area 7 indicated in FIG. 1, the segment 94 will be in about the position shown in FIG. 6, contact with the brush 95 being maintained over an angle determined by the area 7. The two transducers 13 and 14, only one of which is energized at a time, may be supplied with energy at two selected frequencies, for example 250 kilocycles and 750 kilocycles, respectively, the oscillator and amplifier circuits being selected according to the frequency to be transmitted. The electrical circuits including the scanning arrangement for the receiving transducer are shown in FIG. 7. The receiving transducer 39 is provided with two rows of piezoelectric crystals 97 and 98 for high and low frequency signals, respectively. These crystals are cut to sizes such that they resonate at the desired frequencies and produce voltages corresponding to the sound vibrations impressed on the crystals. An arrangement suitable for mounting these crystals is described and claimed in an application Serial No. 619,726, now Patent No. 2,829,361, filed concurrently herewith in the name of Robert B. Crandell et al. and assigned to the same assignee as the present invention. The lines of crystals 97 and 98 are located in the focal zone or region of the reflector 38 so that the intensity and resolution of the signals reaching the crystals is as great as practicable. Reference is made to a focal zone or region rather than to a focal surface because, when sound energy is employed even at supersonic frequencies, the wave length of the energy is sufficiently great that the focal positions at different frequencies may be different for the same reflector. In the present instance, for example, the rows of crystals 97 and 98, although required to receive different frequencies, are arranged in the same assembly along the same line of curvature in the vertical plane through the center of the reflector 38 and the transducer 39; furthermore, the line constituting the locus of focal points for the reflector also changes with the changes in range of the receiver, this being similar to the change in the depth of focus for an optical camera at different ranges. It will thus be understood that the lines of crystals are arranged so that the individual crystals lie as nearly as possible in the most favorable position for the reception of signals at preselected frequencies. Obviously, if desired, more than a single row of crystals might be employed for each frequency and in such case all the crystals might be arranged in the focal region. By employing a line of crystals or other transducer elements with the parabolic reflector in the manner just described the receiver is made highly directional so that it will receive supersonic energy substantially only in a plane passing through the center of the reflector 38 and through the line of elements, each of the elements in the line representing a different angular position or declination of the source of the signal with respect to the receiver.

The high frequency crystals 97 are connected to an electrostatic scanner 99 and the low frequency elements are connected to an electrostatic scanner 100. The scanner 99 comprises two similar insulated stationary disks 101 and an insulated rotating disk 102. The stationary disks are provided with conducting arms or fingers 103 one for each of the crystals of the row 97. In the drawing the plates are arranged in so-called "exploded" positions for purposes of illustration; however, in practice they are arranged sufficiently close together so that a plurality of arms 104 on the disk 102 will couple the elements 103 successively to an output connection 105 through an annular capacity plate 106 on disk 102 and complementary plates 107 on the disk 101. The low frequency scanner 100 is of similar construction and comprises stationary disks 108 provided with conducting fingers 109 connected to respective ones of the crystals in the line 98 and having rotating disks 110 with conducting arms 111 arranged to couple the conductors 109 capacitively to annular plates 112 on the stationary disks 108, the coupling of the plates 112 being accomplished through intermediate plates 113 on the disk 110. In the diagram of both the high and low frequency scanners only one of the pairs of fingers 103 and 109 of each scanner has been shown connected to a crystal in order to avoid complication in the drawing. The disks 102 and 110 are connected to a common drive shaft 114 rotated by a suitable motor (not shown), and in order to synchronize the deflection of the cathode ray beam with the scanning of the lines of crystals a pulsing device 115 is connected to be rotated by the shaft. This device comprises a plurality of permanent magnets 116 arranged to pass a stationary coil 117 and produce a pulse each time that one of the arms of the disks 102 and 110 begins its scanning operation. The construction and operation of the scanning equipment just described is more fully described, and is claimed in a copending application Serial No. 619,725, now Patent No. 2,818,550, filed concurrently herewith in the name of Robert B. Crandell et al. and assigned to the same assignee as the present invention.

The scanners 99 and 100 as described above supply signals successively from the crystals in the lines 97 and 98 and the scanning operation is repeated each time one of the three arms 104 or 111 passes between the groups of conducting fingers. The signals from whichever one of the scanners 99 and 100 is receiving signals are supplied to a preamplifier and converter 118 which is arranged within the casing 42 of the receiver assembly shown in FIG. 4. The signals are then conducted through an inductive rotary coupling 119 in the head 15a of the receiver and are supplied to an intermediate frequency amplifier and detector 120 the output of which is connected to a control electrode or grid 121 of a cathode ray electron discharge device or tube 122. The device 122 includes a heated cathode 123, a first anode 124 and a second or high potential anode 125 by means of which an electron beam is formed in the usual manner and is arranged to activate a screen of luminescent material on the inside of the face 11 of the tube, the intensity of the beam being controlled by the signals supplied to the control electrode 121.

In order to sweep the beam radially in synchronism with the scanning of the crystals in the rows 97 and 98, the pulses from the coil 117 are supplied to a radial deflection current generating circuit 126 which is connected to supply a pair of deflecting coils 127 arranged on a rotatable yoke including cores 128. The deflection coil yoke is rotated in synchronism with the receiver and transducer as shown in the upper left-hand corner of FIG. 5 where the yoke cores are shown mounted in a gear ring 129. In order to rotate the ring 129 and thus the coils 127 in synchronism with the receiver, a motor 130 is connected to the gear 129 through a pinion 131 and is controlled in synchronism with the driving motor 68 by means of a selsyn 132 driven by a gear 133 in mesh with the gear 70. The selsyn 132 supplies its signal to a followup selsyn 134 which in turn supplies the signal to a servo amplifier equipment 135 to supply power to the motor 130. The followup selsyn 134 is geared to the ring 129 by a gear 136 having a 1:1 ratio with the gear 129. The gear 129 and coils 127 are thus rotated in synchronism with the receiver.

The arrangement of the cathode ray tube just described is such that circumferential distances on the tube surface represent azimuthal distances, and radial lines on the screen 11 represent declination angles. During the operation of the underwater object locator described above the receiver and transmitter are rotated continuously at the same speed and with for example the low frequency transducer 13 in operation. The angle of lag between the receiver and the transmitter is changed in order to focus the transmitter and receiver in volumes of water at different ranges in the search for objects therein. When an echo is received from an object a shadowgraph thereof begins to appear on the screen 11, and as the vessel moves forward the image of the object progresses across the screen. In order to maintain the image in a desired position on the screen, the angle between the transmitter and receiver, and their declination, may be changed to compensate for movement of the vessel or the vessel may be stopped to permit continued observation of the object at a selected range. The manner in which the signals are transmitted and received is illustrated in FIGS. 8, 9 and 10 in which the transmitter and receiver are shown in three positions of rotation with their axes at an angle α which is the angle of the receiver with respect to the transmitter. The angle α is determined by three factors. The time of travel of sound, the parallax due to the physical separation of the transmitter from the receiver, and the speed of rotation of the transmitter and receiver. In these three figures it is assumed that both the receiver and transmitter are rotating in a clockwise direction about the vertical axes as viewed in the figure, it being assumed that these views are taken from above. In FIG. 8 the beam 6 from the transmitter has just passed over an object 137 and an echo 138 has started back toward the receiver.

For simplicity of illustration the outline of the transmitted beam has been shown with straight lines, whereas actually the boundaries of the transmitted beam are curved due to the rotation of the transmitter. It will be understood that the echo 138 actually goes out from the object 137 over a wide angle; however, only the narrow angle subtended by the receiver assembly has been shown for purposes of illustration. It will be noted that the axis of the reflector 38 is pointing away from the object 137 and that the echo has not yet had time to reach the receiver. In FIG. 9 the transmitter beam 6 has passed completely over the object 137 and the echo 138 has progressed to a position intermediate the object 137 and the receiver. In FIG. 10 the transmitter 13 has passed the zone under investigation and has ceased to operate, as by interruption of the keying mechanism 92 of FIG. 6, and the receiver is pointing directly at the object 137. The echo 138 has reached the reflector 38 and a portion has already reached the transducer 39. During the passage of the centerline or plane of the reflector 38 over the object 137, echoes from the object are supplied to the transducer 39 and the transducer is scanned as described above to determine the characteristics of the surface of the object. Several scannings of the line of elements in the transducer 39 occur during the passage of the centerline of the receiver across the object, and as a result a picture is formed on the luminescent screen 11 of the cathode ray tube.

The manner in which the declination of an object is determined will more readily be apparent from FIG. 11 in which the reflector 38 and the transducer 39 have been shown diagrammatically in perspective in a position in alignment with the object 137 and with an object 139 directly under the object 137, both these objects lying in the vertical receiving plane of the receiver. Echoes from the object 137 pass to the receiver between two lines 140 and are focused on a crystal in the lower portion of the transducer 39 as indicated at 141. Echoes from the object 139 pass to the receiver between lines 142 and are focused on a crystal in the upper portion of the transducer as indicated at 143. Objects intermediate the objects 137 and 139 would be focused on crystals intermediate the crystals 141 and 143. Any objects not in the vertical plane through the line of crystals and the center of the reflector 38 would be focused on points or zones lying outside the line of crystals and would not be represented on the screen until they are brought into the central vertical plane of the receiver. By employing a relatively high supersonic frequency and a large number of crystals tuned to that frequency, it is possible to obtain an image of good definition. The range of the apparatus decreases with increased frequency because of the greater attenuation of the high frequency energy on its passage through water. For this reason it is desirable to employ the lower frequency transducer 13 when searching for objects and thereafter to utilize the higher frequency transducer 14 to obtain an image of greater definition. Satisfactory operation of an equipment embodying this invention has been obtained with the low frequency transducer operating at 250 kilocycles and the high frequency transducer operating at 750 kilocycles. Obviously the definition obtained will be greater for larger reflectors and greater numbers of crystals.

The apparatus described above makes it possible to examine the areas of the ocean and the ocean bottom in the vicinity of a vessel within ranges up to, say, 1000 feet and to determine not only the location of objects but also their approximate size and shape. The equipment, therefore, eliminates a great amount of labor and uncertainty in connection with the clearing of harbors in salvaging materials and in similar operations.

While a particular embodiment of the invention has been illustrated it will, of course, be understood that it is not desired that the invention be limited thereto since different modifications may be made both in the apparatus and in the control and operating circuits. It is therefore intended by the appended claims to cover all modifications which fall within the spirit and scope of the invention.

What we claim as new and desire to secure by Letters Patent of the United States is:

1. An apparatus for locating objects under water and for determining the approximate size and shape thereof comprising means for transmitting under water a beam of supersonic wave energy at a predetermined frequency, means for directing said beam through a volume of water under examination whereby echoes are reflected from any objects in said volume, means for receiving echoes from any objects in preselected unit portions of said volume, means for scanning said unit portions of said volume successively to receive the echoes from any objects therein, and means for translating said received echoes into electrical signals for presentation upon a luminescent screen to provide an image of any objects in said volume of water under examination.

2. An apparatus for locating objects under water and for determining the approximate size and shape thereof comprising means for transmitting under water a beam of supersonic wave energy at a predetermined frequency, means for directing said beam through a volume of water under examination whereby echoes are reflected from any objects in said volume, a receiving transducer sensitive to supersonic wave energy of said frequency, said transducer being directional and capable of receiving substantial echo wave energy from a unit portion only of the volume of water under examination, means for moving said transducer to receive echoes from successive unit portions of said volume of water, and means utilizing the signals received by said transducer for forming a composite image of said unit portions whereby the approximate size and shape of objects in said volume of water may be determined.

3. An apparatus for locating objects under water and for determining the approximate size and shape thereof comprising means for transmitting under water a beam of supersonic wave energy at a predetermined frequency, means for directing said beam through a volume of water under examination whereby echoes are reflected from any objects in said volume, a receiving transducer sensitive to supersonic wave energy of said frequency, said transducer being directional and capable of receiving substantial echo wave energy from a unit portion only of the volume of water under examination, means for moving said transducer to receive echoes from successive unit portions of same volume of water, means associated with said receiver for rapidly scanning successive individual elements of each of said unit portions of said volume of water to provide signals representing the intensity of echoes from selected positions in each of said unit portions, and means utilizing the signals provided by said last-mentioned means for forming a composite image of said echoes whereby the approximate size and shape of objects in said volume of water may be determined.

4. An apparatus for locating objects under water and for determining their approximate size and shape comprising a transmitter for projecting under water a beam of supersonic wave energy at a predetermined frequency, a receiver spaced from said transmitter and sensitive to supersonic wave energy of said frequency, said receiver being directional and capable of receiving energy from a cross sectional area of the size of a relatively small unit of the cross section of said beam, means for rotating said receiver and said transmitter at a predetermined uniform speed whereby said beam traverses a predetermined volume of water, means for varying the angle between said transmitter and said receiver during their rotation to select for examination a portion of said volume of water at a distance from said receiver as determined by the angle between said receiver and said transmitter, a signal translating device having a luminescent screen, scanning means associated with said receiver for supplying to said device successively signals representing discrete elements of each successive unit area covered by said receiver whereby images of objects in said portion of said volume of water may be presented on said screen.

5. An apparatus for locating objects under water and for determining their approximate size and shape comprising means for projecting under water a beam of supersonic wave energy of a predetermined frequency and having a substantial rectangular cross section, means sensitive to energy of said frequency and arranged to receive energy substantially only in a vertical plane and over a predetermined range of angles of declination, means arranged to rotate said last mentioned means for rotating said vertical plane to receive wave energy echoes from a predetermined volume of water traversed by said beam, said receiving means including signal receiving elements for receiving signals reaching said receiver at a plurality of successive small angles of declination, a signal translating apparatus of the luminescent screen type, and scanning means for supplying to said apparatus successively and repeatedly the signals from said elements for presentation as an image on the screen of said translating apparatus.

6. An apparatus for locating objects under water and for determining their approximate size and shape comprising means for projecting under water a beam of supersonic wave energy of a predetermined frequency and having a substantially rectangular cross section, means for rotating said last mentioned means to sweep said beam through a predetermined volume of water, means sensitive to energy of said frequency and arranged to receive energy substantially only in a vertical plane and over a predetermined range of angles of declination, means arranged to rotate said last mentioned means for rotating said vertical plane at the same speed as said beam projecting means to receive echo wave energy from said predetermined volume of water traversed by said wide beam, said receiving means including signal receiving elements for receiving signals reaching said receiver at a plurality of successive small angles of declination, means for adjusting the average angle between said beam and said vertical plane whereby the angle between said vertical plane and said beam determines the operating range of said apparatus and a predetermined portion of said volume of water may be selected for examination, a signal translating apparatus of the luminescent screen type, and scanning means for supplying to said apparatus successively and repeatedly the signals from said elements for presentation as a picture image on the screen of said translating apparatus during the rotation of said receiving means.

7. In an apparatus utilizing supersonic wave energy for locating objects under water and for determining their approximate size and shape, a device for receiving supersonic energy at a predetermined frequency comprising a parabolic reflector, a plurality of wave energy receiving elements, means for mounting said elements in a line in the focal zone of said reflector for said frequency, and means for scanning said elements successively to produce an image of the objects from which the supersonic wave energy is received.

8. An apparatus for locating objects under water and for determining their approximate size and shape comprising means for projecting under water a beam of supersonic wave energy at a predetermined frequency whereby objects in the path of said beam reflect echoes at said frequency, a receiver for receiving wave energy at said frequency and substantially solely in a predetermined plane, said receiver comprising a curved surface reflector and a line of signal transducing elements arranged substantially in the focal zone of said reflector for said frequency, means for rotating said receiver about an axis in the plane of said line of elements and transverse to the axis of said reflector whereby each of said elements receives echoes from a discrete small volume of water traversed by said beam and in said plane, means for scanning said elements at a high rate of speed during rotation of said receiver, and means utilizing the scanned signals from said elements to produce an image of any objects in the selected volume of water traversed by said beam.

9. An apparatus for locating objects under water and for determining their approximate size and shape comprising a transmitter for projecting a beam of supersonic wave energy through a volume of water under investigation, a supersonic energy receiver arranged to receive energy substantially only from a limited field, means for rotating said transmitter and said receiver in synchronism about relatively fixed axes whereby the field of said receiver sweeps through the volume of water through which said beam has been projected and said receiver receives echoes of supersonic energy from objects in the path of said beam in said volume of water, and signal translating apparatus for providing a visual representation of said echoes.

10. An apparatus arranged to be mounted on a vessel, subject to rolling and pitching, for locating objects under water and for determining their approximate size and shape comprising a transmitter for projecting a beam of supersonic wave energy through a volume of water under investigation, a supersonic energy receiver arranged to receive energy substantially only from a limited field, means for rotating said transmitter and said receiver in synchronism, means for stabilizing the axes of rotation of said transmitter and said receiver to maintain said axes in fixed relation regardless of the rolling and the pitching of the vessel on which said apparatus is mounted whereby the field of said receiver sweeps through the volume of water through which said beam has been projected to receive echoes of supersonic energy from objects in said volume of water, and signal translating apparatus for providing a visual representation of said echoes.

11. An apparatus for locating objects under water and for determining their approximate size and shape comprising a transmitter for projecting a beam of supersonic wave energy through a volume of water under investigation, a supersonic energy receiver arranged to receive energy substantially only from a limited field, means for rotating said transmitter and said receiver in synchronism about relatively fixed axes whereby the field of said receiver sweeps through the volume of water through which said beam has been projected and said receiver receives echoes of supersonic energy from objects in the path of said beam in said volume of water, said receiver including means arranged to be energized by individual signals in selected portions of said limited field, means for scanning said individual signal energized means rapidly in succession, said scanning means being arranged to scan said receiver a substantial number of times during sweeping of said receiver field through said volume of water, and signal translating apparatus arranged to receive said scanned signals and to form a composite visual representation of said echoes.

12. An apparatus arranged to be mounted on a vessel subject to rolling and pitching for locating objects under water and for determining their approximate size and shape comprising a transmitter for projecting a beam of supersonic wave energy through a volume of water under investigation, a supersonic energy receiver arranged to receive energy substantially only from a limited field, means for rotating said transmitter and said receiver in synchronism, means for stabilizing the axes of rotation of said transmitter and said receiver to maintain said axes in fixed relation regardless of the rolling and the pitching of the vessel on which said apparatus is mounted whereby the field of the receiver sweeps through the volume of water through which said beam has been projected to receive echoes of supersonic energy from objects in said volume of water, individual closed housings having sound transmitting windows for said transmitter and for said receiver together with the respective stabilizing mechanisms therefor, said housings being filled with a sound transmitting liquid whereby said transmitter and said receiver may be rotated without interference from the water in which said vessel is operated, and signal translating apparatus arranged to be mounted remotely from said receiver for providing a visual representation of said echoes.

13. An apparatus arranged to be mounted on a vessel subject to rolling and pitching for locating objects under water and for determining their approximate size and shape comprising a transmitter for projecting a beam of supersonic wave energy through a volume of water under investigation, a supersonic energy receiver arranged to receive energy substantially only from a limited field, means for mounting said transmitter and said receiver for rotation about vertical axes, means for maintaining said axes stable regardless of rolling and pitching of the vessel whereby the field of said receiver sweeps through the volume of water through which said beam has been projected and said receiver receives eachoes of said supersonic energy from objects in said volume of water, means for simultaneously adjusting the declination of said transmitter and said receiver whereby the average declination with respect to the vessel of the volume of water under examination may be selected, and signal translating apparatus arranged to be carried by the vessel remote from said receiver for providing a visual representation of said echoes.

14. An apparatus arranged to be mounted on a vessel subject to rolling and pitching for locating objects under water and for determining their approximate size and shape comprising a transmitter for projecting a beam of supersonic wave energy through a volume of water under investigation, a supersonic energy receiver arranged to receive energy substantially only from a limited field, means for rotating said transmitter and said receiver in synchronism, means for stabilizing the axes of rotation of said transmitter and said receiver to maintain said axes in fixed relation regardless of the rolling and the pitching of the vessel on which said apparatus is mounted whereby the field of said receiver sweeps through the volume of water through which said beam has been projected to receive echoes of supersonic energy from objects in said volume of water, means for adjusting the angle between said transmitter and said receiver for focusing said transmitter and said receiver on a selected portion of the volume of water through which said beam is projected, and signal translating apparatus for providing a visual representation of said echoes.

15. An apparatus for locating objects under water and for determining their approximate size and shape comprising a transmitter for exciting a selected volume of water with supersonic wave energy, a supersonic energy receiver arranged to receive energy substantially only in a predetermined plane, means for rotating said receiver to sweep said plane through said volume of water whereby said receiver receives echoes from objects within said volume, said receiver including means for collecting in succession individual signals from a series of points within said plane, a signal translating apparatus including an electron discharge device of the cathode ray beam type having a luminescent screen, means for supplying successive groups of said scanned signals to said beam during rotation of said receiver, means for rotating said devices in synchronism with said receiver, and means for deflecting said beam radially in synchronism with the scanning of said singals whereby azimuthal positions of objects are represented circumferentially on said screen and angles of declination of the objects are represented radially thereon.

16. Apparatus for ascertaining the structure of an object in water comprising a source of compressional waves in the sonic or ultrasonic range adapted to be immersed in water, means for projecting waves from said source upon said object whereby the intensity of said waves will be modified and said modified waves will be reflected in a pattern corresponding to the structure of said object, a mosaic adapted to be arranged in the path of said reflected waves and comprising a multiplicity of vibratile elements each capable of translating reflected waves which impinge thereon into an electrical wave corresponding to the position and intensity of the compressional waves in said reflected wave pattern, means focussing said reflected pattern on said mosaic, means for transmitting said electrical waves out of said water and means responsive to the impress thereon of said discrete electrical waves for converting said electrical waves into an optical image corresponding to the intensity and relative position of the compressional waves in said reflected wave pattern.

17. Apparatus for producing an optical image of an obfuscated object, said apparatus comprising means for projecting compressional waves in the sonic or ultrasonic range of a frequency capable of penetrating the obfuscating medium onto said object whereby said waves will be modified and reflected in a pattern corresponding to the structure of said object, a mosaic comprising a multiplicity of vibratile elements for picking up at least some of said reflected modified compressional waves and converting said picked-up waves into a multiplicity of discrete electrical signals corresponding to their position of reflection from said object, means focussing said reflected-up waves on said mosaic and means for converting said discrete electrical signals into an optical image of said object.

18. The invention as set forth in claim 17 and wherein said vibratile elements comprise piezoelectrical crystals.

19. The invention as set forth in claim 17 and wherein said means for converting said discrete electrical signals into an optical image comprises a cathode ray Kinescope.

References Cited in the file of this patent

UNITED STATES PATENTS

| | | |
|---|---|---|
| 1,562,950 | Fessenden | Nov. 24, 1925 |
| 1,781,799 | Baird | Nov. 18, 1930 |
| 1,933,392 | Schmidling | Oct. 31, 1933 |
| 2,031,884 | Gray | Feb. 25, 1936 |

(Other references on following page)

UNITED STATES PATENTS

| | | | |
|---|---|---|---|
| 2,164,125 | Sokoloff | June 27, | 1939 |
| 2,288,871 | Adams | July 7, | 1942 |
| 2,306,272 | Levy | Dec. 23, | 1942 |
| 2,369,622 | Toulon | Feb. 13, | 1945 |
| 2,373,396 | Hefele | Apr. 10, | 1945 |
| 2,399,017 | Goldman | Apr. 23, | 1946 |
| 2,407,697 | Williams | Sept. 17, | 1946 |
| 2,417,446 | Reynolds | Mar. 18, | 1947 |
| 2,418,846 | Mecham | Apr. 15, | 1947 |
| 2,426,657 | Williams | Sept. 2, | 1947 |
| 2,453,502 | Dimmick | Nov. 9, | 1948 |

FOREIGN PATENTS

| | | | |
|---|---|---|---|
| 301,034 | Great Britain | Feb. 21, | 1930 |
| 840,432 | France | Apr. 25, | 1939 |
| 371,101 | Italy | May 11, | 1939 |
| 373,175 | Italy | July 20, | 1939 |
| 863,792 | France | Apr. 9, | 1941 |
| 863,173 | France | Apr. 9, | 1941 |

OTHER REFERENCES

Radar System Considerations, by D. A. Ivarlas, 3 pages, 1947.